Nov. 8, 1927.
F. HUMPHRIS
1,648,849
EDGE PRESSURE PLATE FOR USE IN PRESSES AND LIKE MACHINES
Filed Nov. 8, 1926   2 Sheets-Sheet 1
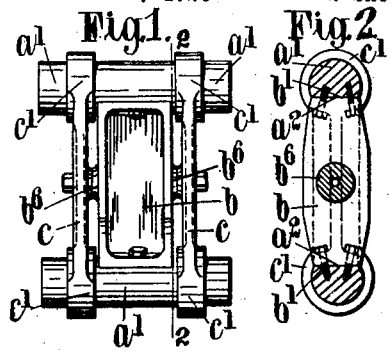
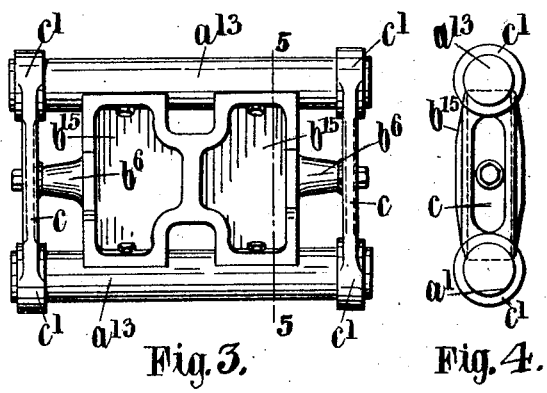
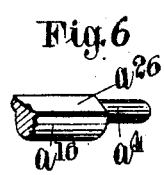
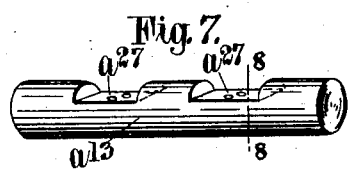
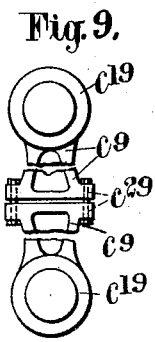
INVENTOR
Frank Humphris
BY
ATTORNEY Nov. 8, 1927. 1,648,849
F. HUMPHRIS
EDGE PRESSURE PLATE FOR USE IN PRESSES AND LIKE MACHINES
Filed Nov. 8, 1926 2 Sheets-Sheet 2

INVENTOR
Frank Humphris
BY
ATTORNEY

Patented Nov. 8, 1927.

1,648,849

UNITED STATES PATENT OFFICE.

FRANK HUMPHRIS, OF PARKSTONE, ENGLAND.

EDGE-PRESSURE PLATE FOR USE IN PRESSES AND LIKE MACHINES.

Application filed November 8, 1926, Serial No. 147,149, and in Great Britain October 21, 1925.

This invention relates to edge-pressure-plates for use in presses and like machines particularly to edge pressure plates to be substituted for those disclosed in U. S. Patent Number 1,473,478. Edge-pressure-plates made in one piece according to said patent are both difficult and expensive to produce, because the so-called rounded-bearing-ends thereof, which are an integral part of such edge-pressure-plate, must be made accurately and parallel one to the other and should have, throughout the whole of their length, a like curvature to that of a cylinder of the same diameter. It is impossible to correct any machining error which may occur in the manufacture of such edge-pressure-plate, and no edge pressure plate wherein any such error may occur should be used or included in any working group or set of edge-pressure-plates because if machining errors should occur and such edge-pressure-plate was machined again it would be either too short or the so-called rounded-bearing-end would be too small, so that in this condition it would not work correctly if it were employed as one of a group or set of edge-pressure-plates.

In those cases where edge-pressure-plates are made up of plates arranged in a laminar form and riveted or welded to extension-pieces provided on separate so-called rounded-bearing-end parts, it has been found in practice that these conditions distort the plates and rounded-ends thereof and it is not possible to correct this defect because any removal of metal or material from the said rounded-bearing-ends makes them too small and the edge-pressure-plate too short.

To provide a new form of edge-pressure-plate in which such defects connot exist is an object of the present invention.

A further object of this invention is to construct and provide edge-pressure-plates for use in presses and like machines which can be made more cheaply and with greater accuracy than has hitherto been the case. In the edge-pressure-plates described in U. S. Patent Number 1,473,478 each of the so-called rounded-bearing-ends thereof must be formed and finished either by using concave-cutters which rapidly wear or become fractured on their cutting-edges, or by pointed-tools which must move in a direction parallel to the axis of each of the said rounded-bearing-ends. This leaves the bearing-ends grooved and rough, and attempts have been made to finish them by grinding, but this is practically impossible because only a part of a revolution can be given to the edge-pressure-plate and on account of the constant reversal of direction during the removal of material, true cylindrical grinding does not result; therefore these processes in practice are incapable of producing any two edge-pressure-plates or any two ends of one edge-pressure-plate alike or with duplicate rounded-bearing-ends having the necessary degree of accuracy, so that hand finishing has to be resorted to.

Briefly, this invention consists in providing an edge-pressure-plate having a centre-plate on or to which separately formed rounded-parts or ends are secured, with the axes of the said rounded-parts or ends parallel one to the other and lying in the same plane.

Various forms or patterns of edge-pressure-plates can be made embodying the essential lines of construction hereinafter referred to, but for the purpose of giving a more clear understanding the invention is hereinafter described with reference to the accompanying drawings in which:—

Figure 1 is a front elevational view of a form of the present invention showing how partially-segmented-cylinders are used as the rounded-bearing-ends and are supported or held by side-plates or links. The cylindrical free ends of the partially-segmented-cylinders pass through the side plates and serve as journals so that such edge-pressure-plate may also be used as a connecting link.

Figure 2 is a part sectional view taken on the line 2—2, Figure 1.

Figure 3 is a front elevational view of a modification of Figure 1 showing how partially-segmented-cylinders or bearing-ends contact with a centre-plate at two positions so that each of the cylindrical portions thereof can be used as journal-bearings. In this modification the links or side-plates are located near the extremities of the cylindrical end-parts of the partially-segmented-cylinders where they are held in position by being bolted to protuberances provided on the centre-plate.

Figure 4 is an end view of Figure 3.

Figure 5 is a sectional view taken on the line 5—5, Figure 3 showing how the partially-segmented-cylinders contact with the centre-plate.

Figure 16:
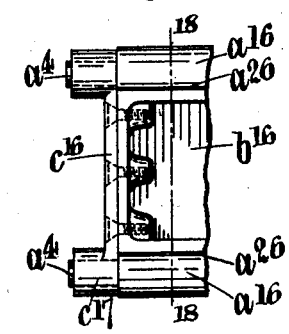

Figure 6 is a perspective view of part of a segmented-cylinder of the kind shown in Figure 16 and having a reduced end-part to engage in a perforation of a boss on a link or side-plate of the kind shown in Figure 16.

Figure 7 is a perspective view of one partially segmented-cylinder on which there are provided two plane-surfaces for making bearing-contact with a centre-plate as shown in Figure 3.

Figure 8 is a sectional view taken on the line 8—8, Figure 7, through that part of the cylinder or bearing-end which is referred to as a partially-segmented-cylinder.

Figure 9 is an elevational view of a link or side-plate made in two parts and provided with flanges or bosses by means of which said parts can be bolted together.

Figure 10:
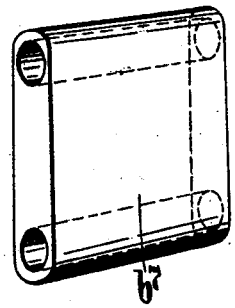
Figure 11:
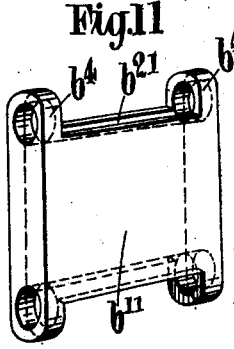
Figure 12:
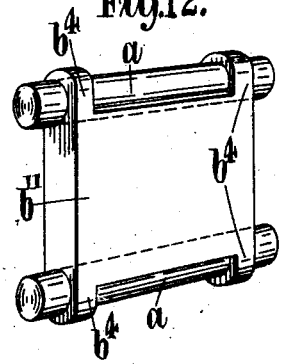

Figure 10 is a perspective view of a partly finished piece of metal or material which has been bored to show a partly machined state of a centre-plate of the kind shown in Figures 11 and 12.

Figure 11 is a perspective view of a finished centre-plate made from a piece of metal or material as shown in Figure 10 after it has been machined so as to leave lugs or projections.

Figure 12 is a perspective view of a finished and assembled edge-pressure-plate with two true cylinders serving as the rounded-bearing-ends thereof.

Figure 13:
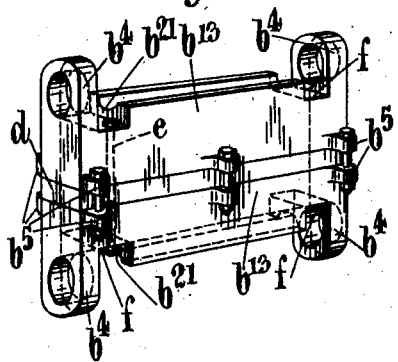

Figure 13 is a perspective view of a finished centre-plate of the kind similar to that shown in Figure 11 but provided with clearance-grooves to permit the use of journal-caps. This view shows a centre-plate which is divided so as to enable adjustment to be made both in the alignment of or distance between the bearing-ends or cylinders after the parts are assembled and lightly bolted together.

Figure 14:
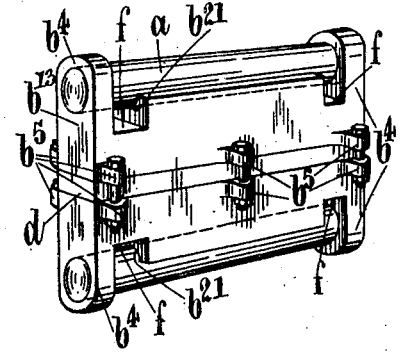

Figure 14 is a perspective view of Figure 13 after the bearing-ends or true cylinders have been assembled therein.

Figure 15:

Figure 15 is an elevational view of a side-plate or link the perforated bosses of which are divided and provided with bolts so that they may be clamped on the rounded-bearing-ends.

Figure 16 is a front elevation of a part of an edge-pressure-plate in which segmented-cylinders with reduced end-parts are employed to engage in the perforations of bosses on a side-plate or link.

Figure 17:
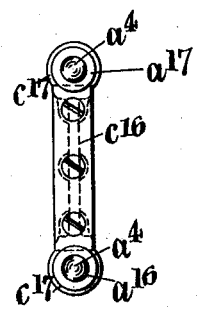

Figure 17 is a side elevational view illustrating one method of affixing the side-plate with perforated-bosses as shown in Figure 16 to the centre-plate.

Figure 18:
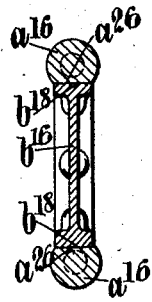

Figure 18 is a view in cross-section on the line 18—18, Figure 16.

The same letters of reference indicate like parts throughout the said drawings.

In the convenient embodiments of the present invention, as shown in the drawings, there are provided two rounded bearing-ends consisting of solid or segmented-cylinders, an integral or divided centre-plate with links or side-plates and screwed-members are used for holding the chief component parts of the invention together.

In all forms of this invention each of the rounded parts or ends are so produced that each retains the bearing-surface conditions of a true-cylinder and to ensure this condition they are machined, ground and finished to within very fine limits of an absolute dimension as true-cylinders.

Figures 1 and 2 show each cylindrical end or bearing part $a^1$ as having a portion of its periphery cut away between its ends producing a single plane surface $a^2$ and giving the end part the form of a segmented cylinder at such place. The plane surface $a^2$ is seated against a substantially co-extensive plane surface $b'$ formed on an end of the center plate $b$.

Figures 3, 4, 5, 7 and 8 show each cylindrical end or bearing part $a^{13}$ as having its periphery cut away at two places producing a pair of plane surfaces $a^{27}$ and giving the end part the form of a segmented cylinder at such places. Each pair of plane surfaces $a^{27}$ is seated against a pair of substantially coextensive plane bearing surfaces $b^{14}$ formed on one end of the center plate $b^{15}$.

Figure 6, shows a cylindrical end or bearing part $a^{16}$ having its periphery cut away for its entire length to form a single longitudinal plane surface $a^{26}$ and giving such part the form of a segmented cylinder throughout its length.

Figures 12 and 14 show the end or bearing parts $a$ as each being of true cylindrical form and as each seated in a semi-circular recess $b^{21}$ extending longitudinally of an end of a center plate $b^{11}$ (Figures 11 and 12) or $b^{13}$ (Figures 13 and 14).

Whatever may be the form of the bearing ends and center plate, means are provided at the opposite side edges of the center plate for retaining the bearing ends on the ends of the center plate. Such means may consist, as shown in Figures 1 to 5, of a pair of separate side plates $c$, each having at each of its ends a boss $c'$ provided with a circular opening through which the cylindrical portion of a bearing end $a'$ or $a^{13}$ extends. These side plates $c$ may be secured to the side edges of the center plate by any suitable means, such as screws passing through the side plates and engaging projections $b^6$ formed on the side edges of the center plate, as shown in Figures 1 to 4, or the side plates may be formed integral with the center plate, as shown in Figures 11 to 14, wherein a pair of lugs or projections $b^4$ are shown as projecting from each end of the center plate $b^{11}$ or $b^{13}$ at the side edges of the latter, each of said lugs having a circular opening through which a bearing end extends.

In Figures 1 to 4 the bearing ends $a'$ and $a^{13}$ are shown as additionally secured to the center plate $b$ or $b^{15}$ by means of screws passing through projections at the ends of the center plate and engaging the bearing ends.

In some embodiments of this invention the rounded-part or end $a^{16}$, (see Figures 6 and 16) is provided with reduced-parts $a^4$, of any desired length and these reduced parts $a^4$ may be inserted into recesses or holes in the perforated-bosses $c^{17}$, which are provided on the side-plates or links $c^{16}$, so that the exterior of the said perforated bosses $c^{17}$, can be used either as journals or pivots. The side-plates or links not only keep the rounded-end parts in position on the centre-plate but also serve to resist any force tending to separate the two bosses and these side-plates or links may either be made in one piece (see Figures 1, 3, 4 and 16), or may be made in two-pieces and are then provided with bolts or the like to secure the two-pieces together in any known manner, (as an example see Figure 9) so that the said links or side-plates $c^6$, will serve as means for clamping or drawing any of the rounded-parts or ends tightly on to any of the abutting-faces on a centre-plate.

In presses or like machines embodying edge-pressure-plates made according to this invention and especially where they are to be employed for use at high speeds or where great rigidity is essential and where the risk of bolts, screwed-members, side-plates or links becoming loose must be avoided only three chief separate-parts need be embodied in such an edge-pressure-plate. These three chief parts consist of two true cylinders $a$, of any desired diameter or length and one centre-plate with parts equivalent to the side plates and their bosses made integral therewith. The center plate is made from one piece of metal or material, or from a block $b^7$ (Figure 10), which is provided with two accurately formed perforations therethrough of the correct size and with the walls thereof parallel to the respective axis of each perforation and the axes of both perforations parallel to each other and lying in the same plane. Furthermore the said perforations are also formed of such a correct size that they will allow a true cylinder $a$, hereinbefore more specifically described, to be forced press-fit-wise into, suitably secured in each perforation; but this is not done until after the said perforated block $b^7$, has been so machined, or has had metal or material removed from part of the perforated ends thereof, as shown in Figure 11, in such a manner as to leave in that part of the partly machined block $b^7$, from where the metal or material has been removed, almost a complete semi-circular groove or curved face $b^{21}$, the whole surface of which serves to abut with a part of the true cylinder $a$, when the latter is placed in position as shown in Figures 12 and 14. By constructing an edge-pressure-plate in the manner illustrated in Figure 12 the centre-plate $b^{11}$, having lugs or projections $b^4$, thereon serves a dual purpose, since no separate side-plates or links are required and no bolts, screws or the like means is necessary for holding the two true cylinders $a$, on or to the centre-plate $b^{11}$.

In Figures 13 and 14 a modification of the three-piece edge-pressure-plate shown in Figure 12, is illustrated. In this modification the centre-plate $b^{13}$, formed in two pieces, which are bolted together in any known manner, either as shown in the illustrations or preferably by means of clamping-bolts $e$, passing therethrough, one such clamping-bolt $e$, being shown in dotted lines in Figure 13. The centre-plate $b^{13}$ in the modification illustrated is divided so as to permit a distance piece $d$, of any depth or thickness to be inserted between the two parts and also to enable the rounded-bearing-ends or cylinders $a$, or the axes thereof to be arranged at any desired distance apart, which distance is determined by the thickness of such distance-piece $d$. This modification allows standardized bearing-ends for edge-pressure-plates to be made up, so that any one of the various thicknesses of distance-pieces can be used to give any length or distance between the bearing-surfaces of the rounded-ends of the said edge-pressure-plates.

In the modification shown in Figures 13 and 14 clearances $f$, are shown and these are provided to enable caps or journal-covers to be employed on any bearer-plate with which the edge-pressure-plates coact. It will be obvious that any form of centre-plate made according to this invention can be divided in the manner described and illustrated and be held together by means of lugs $b^5$, or bolts $e$, or in any other known manner. It will be obvious that any of the forms of side-plates or links can be divided and coupled through flanges $c^{29}$, as illustrated in Figure 9 or in any other known manner and the dividing of centre-plates, or side-plates or links, for use in or with edge-pressure-plates is intended to be included in the spirit of this invention.

Each rounded-part or end abuts with and also reposes on the surface of one of the beforementioned grooves or curved-faces $b^{21}$, or the plane faces on a centre-plate, and is secured therein or thereon and to the centre-plate, either through the medium of one or more perforated-lugs or projections $b^4$ by side-plates or links, and/or by screws, pins or the like in any known manner.

An essential feature in the construction of the edge-pressure-plates is that the rounded parts or ends are, at one stage of their finishing, formed as true-cylinders, by or in a machine, so as to ensure the necessary accuracy of these parts and any rounded-part or end for use on, in or with an edge-pressure-plate which is formed as or from a cylinder is intended to be included in this invention.

Any rounded-part or end may be hardened and ground to the correct dimension therefor.

The side-plates are secured to the centre-plate by bolts, screws or the like and the bosses $c^{21}$, thereof may be split and have bolts or the like extending therethrough (see Figure 15) in order that the said bosses $c^{21}$, can be clamped on, or to the rounded-parts or ends as desired.

I claim:

1. An edge pressure plate comprising rounded bearing ends, a centre plate having seats at its ends for said bearing ends, and means carried by the centre plate at its side edges for retaining the rounded bearing ends on said seats.

2. An edge pressure plate comprising rounded bearing ends, a centre plate having seats for the bearing ends, and means carried by the centre plate at its side edges and bored to receive the said bearing ends.

3. An edge pressure plate comprising truly cylindrical separately formed bearing ends, a centre plate, and means carried by the centre plate at its side edges and having perforations therein in which the bearing ends fit closely and by which they are held in contact with the centre plate.

4. An edge pressure plate comprising separately formed bearing ends, a centre plate, and means integral with the centre plate and having perforations therein for holding the bearing ends.

5. An edge pressure plate comprising separately formed bearing ends, a centre plate having seats thereon for the bearing ends, and means integral with the centre plate and having perforations therein in which the bearing ends are held in contact with the said seats.

6. An edge pressure plate comprising separatly formed bearing ends, a centre plate divided into two parts, means for securing the said parts together, and means integral with the respective centre plate parts and forming apertured lugs through which the bearing ends extend.

7. An edge pressure plate comprising separately formed bearing ends, a centre plate divided into two parts, means for securing the said parts together, a distance piece inserted between said parts, and apertured lugs integral with the centre plate parts to receive the bearing ends and retain the same in contact with the centre plate.

FRANK HUMPHRIS.